United States Patent Office 2,752,326
Patented June 26, 1956

2,752,326

OXYCRESYL CAMPHENE AS A LIGHT STABILIZER FOR COPOLYMER OF ISOBUTYLENE AND STYRENE

Robert E. Clayton, Jr., Roselle Park, N. J., assignor to Esso Research and Engineering Company, a corporation of Delaware No Drawing. Application March 29, 1952, Serial No. 279,460

1 Claim. (Cl. 260—45.95)

This invention relates to a method for stabilizing copolymers of isobutylene and styrene against light.

The stabilizing of copolymers of isobutylene and styrene against the aging effects of light has present a serious problem, particularly with respect to molecular weight degradation, discoloration and embrittlement.

It is an object of this invention to provide isobutylene-styrene copolymers having improved resistance to deterioration.

It is a particular object of this invention to provide isobutylene-styrene copolymers having increased resistance against molecular weight degradation, discoloration and embrittlement.

These and other object of this invention are accomplished according to this invention by intimately mixing oxycresyl camphene in an isobutylene-styrene copolymer.

Broadly, the copolymer to be stabilized according to the present invention comprises a copolymer of a cyclic alkene and a mono-olefin, which copolymer has intrinsic viscosity greater than 0.7 and having a content of combined styrene or other cyclic constituents of 10 to 90%, preferably 40 to 60%, such copolymers being produced at copolymerization temperatures below −50° C., and preferably below −70° C., a suitable operating temperature being −103° C., since this is the boiling point of liquefied ethylene. Copolymers having the desired high intrinsic viscosity cannot be produced at more elevated temperatures, such as between 0° C. and −50° C.

The intrinsic viscosity may be determined in a suitable solvent such as toluene, using the following formula for calculating the intrinsic viscosity:

$$\text{Intrinsic viscosity} = \frac{2.303 \log_{10} \text{relative viscosity}}{\text{Concentration of copolmer/100 ml.}}$$

Instead of isobutylene, other aliphatic mono-olefins may be used, preferably having more than 2 carbon atoms and preferably iso-olefins having 4 to 8 carbon atoms, such as isopentene (methyl-2 butene-1) or a pentene obtained by dehydration of secondary amyl alcohol.

Instead of styrene, other polymerizable, mono-olefinic aromatic hydrocarbons may be used, such as indene, the homologues of styrene, e. g. alphamethyl styrene, para-methyl styrene, alphamethyl paramethyl styrene or dihydro naphthalene.

The copolymerization is effected by mixing the two reactants, with or without a mutual solvent, if necessary, such as ethylene, propane, butane, methyl chloride or refined naphtha, and then after the cooling of the reactants to the desired low temperature, adding a Friedel-Crafts halide catalyst such as boron fluoride or boron fluoride catalyst activated by the addition of 0.1% of diethyl ether, aluminum chloride, titanium tetrachloride, or aluminum alkoxide-aluminum chloride complex ($AlCl_3.Al(OC_2H_5)_3$). If desired, such catalyst may be dissolved in a solvent such as carbon disulfide, a low molecular weight sulfur-free saturated hydrocarbon, a lower alkyl halide, e. g. methyl chloride, or ethyl chloride, or a mixture of methyl chloride with butane at or below the boiling point of the catalyst solvent, and then the catalyst solution cooled down, filtered and added to the reaction mixture. Alternative catalysts include:

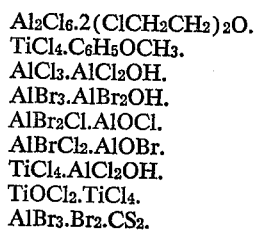

BF₃ solution in ethylene, activated BF₃ catalyst in methyl chloride solution. Volatile solvents or diluents, e. g. propane, ethane, ethylene, methyl chloride, alkyl halides, methylene chloride or carbon dioxide (liquid or solid) may also serve as internal or external refrigerants to carry off the liberated heat of polymerization. After completion of the copolymerization, residual catalyst is hydrolysed with alcohol, for example, isopropyl and excess catalyst removed by washing the product with water and preferably also with dilute aqueous caustic soda. The resulting solid copolymer may range from a viscous fluid or a relatively stiff plastic mass to a hard, tough thermoplastic resinous solid, depending upon the temperature of polymerization, the yield of polymer obtained upon the active feed, the type and concentration of catalyst, the proportion of cyclic reactant in the feed, and the temperature at which the physical texture is observed.

When copolymers are prepared according to this invention, using copolymerization temperatures below −50° C., the resultant products will generally have average molecular weights above 6,000, and preferably 10,000 to 150,000, with intrinsic viscosities above 0.7 and preferably 0.8 to 3.0. The higher molecular weight and intrinsic viscosities are obtained with the lowest copolymerization temperatures, and they are also favored by the lower content of cyclic reactant, i. e., a per cent of combined styrene of 20 to 40%. The hardness of the copolymer generally increases with increasing content of combined styrene or other cyclic constituents.

Thus the prefered operating conditions for making the copolymers for use according to this invention, comprises copolymerizing a reaction mixture containing 40–60% of styrene and balance isobutylene, at a temperature below −70° C. in the presence of about 1–4 volumes of methyl chloride or other lower alkyl halides per volume of active polymerization feed, and using as the catalyst the solution of aluminum chloride dissolved in methyl chloride or other lower alkyl halides.

The following examples are illustrative of the invention, but are not to be considered as limitative thereof. Where parts are mentioned, they are parts by weight.

The compositions in the examples set forth in the table below are prepared by mixing 100 parts of a copolymer of 60% styrene, and 40% isobutylene prepared as described above with 1 part of the indicated stabilizer. The ingredients are mixed on differential speed rolls at a roll temperature of 290° F. to form a homogeneous composition which is removed from the rolls in the form of crude sheets. From these crude sheets are molded sheets having a thickness of about 0.020 in.

For the purpose of determining embrittlement, edges of sheets approximately 3 inches long, 2 inches wide, and .02 inches thick are rapidly brought together in the same plane as the intervening portion. This jams the intervening portion, causing it to wrinkle sharply and in all directions.

The color stability of the products of the examples is determined by exposure in an Atlas Fade-Ometer for 100 hours.

INHIBITORS OF SUNLIGHT AGING FOR S-POLYMERS

[The following inhibitors were added to S-60 on a mill in concentrations of 1 part per 100 parts of polymer]

| Inhibitor Trade Name | Inhibitor Formula | Processing | After Aging 100 Hrs. in Atlas Fade-Ometer | | |
|---|---|---|---|---|---|
| | | | Percent Intr. Vis. Retention | Discoloration | Shock Flex |
| None | | O. K. | 40 | Trace yellow | Broke and shattered. |
| Do | Oxycresyl camphene | O. K. | 80 | None | O. K. |
| Santowhite | An alkylated phenol sulfide made by Monsanto. | Slightly tacky | 59 | Light tan | Broke. |
| Age Rite Resin | Aldol α(-naphthylamine | Tacky | 59 | Tan | Broke and slightly shattered. |
| Albasan | Diethylene triamine salt of β-naphthol. | do | 58 | Light tan | Broke. |
| Thermoflex | p, p' dimethoxy diphenylamine. | Very tacky | 46 | Dark brown | Broke and badly shattered. |
| EFED | Triphenylphosphite | do | 40 | Trace tan | Broke. |
| Age Rite Stalite | Heptilated amine | Tacky | 33 | Light tan | Broke and shattered. |

As can be seen from the examples in the table, compositions having outstanding resistance to deterioration are obtained in accordance with this invention. The data clearly show that the addition of 1 part of oxy cresyl camphene per 100 parts of a copolymer of 60% styrene and 40% isobutylene, improved the molecular weight retention by 100% as judged by the intrinsic viscosity measurements. Furthermore, the stock containing this inhibitor resisted discoloration whereas the control did not. The inhibited material also showed satisfactory results in the embrittlement test.

These results are particularly unexpected since the data further show that other usual age resistors normally used in the rubber and plastics art do not provide the copolymer of isobutylene and styrene with the desired resistant properties.

While the amount of the oxy cresyl camphene which is incorporated in the copolymer may be substantially varied and still result in a surprising improvement in stability, it is usually desirable to have at least .08 to 3 parts, preferably 0.15 to 1.25 parts per 100 parts of the copolymer.

The nature of the present invention having been thus fully set forth and specific examples of the same given, what is claimed as new and useful and desired to be secured by Letters Patent is:

A composition comprising a high molecular weight tough thermoplastic resinous solid copolymer of about 40% isobutylene and about 60% styrene, said copolymer having an intrinsic viscosity above about 0.7 and being substantially free from aliphatic unsaturation and normally quite resistant to oxidation but being subject to deterioration under the effects of light, and as a stabilizer therefor about 1 part of oxycresyl camphene per 100 parts of copolymer.

References Cited in the file of this patent

UNITED STATES PATENTS

| | | |
|---|---|---|
| 2,274,749 | Smyers | Mar. 3, 1942 |
| 2,581,917 | Kitchen | Jan. 8, 1952 |
| 2,606,886 | Amberg | Aug. 12, 1952 |